May 30, 1967 H. E. ROYS 3,322,360

ENDLESS TAPE CARTRIDGE

Filed Aug. 2, 1965

INVENTOR.
HENRY E. ROYS
BY Eugene M. Whitacre
Attorney

United States Patent Office 3,322,360
Patented May 30, 1967

3,322,360
ENDLESS TAPE CARTRIDGE
Henry E. Roys, Indianapolis, Ind., assignor to Radio Corporation of America, a corporation of Delaware
Filed Aug. 2, 1965, Ser. No. 476,510
8 Claims. (Cl. 242—55.19)

This invention relates to tape cartridges, and more particularly to tape cartridges adapted for use with an endless loop of magnetic tape.

In an endless loop tape drive system employing a tape cartridge containing an internal pressure roller positioned to cooperate with a capstan for driving the tape past a transducing means, it has been found desirable to provide a certain amount of slack of looseness in the tape loop. This has the advantage of reducing the friction between adjacent convolutions in the tape roll, and thereby improves wow and flutter characteristics of the cartridge during record or playback operation. Due to the slack in the tape loop there are conditions which may occur when the tape drive system is first energized such that the tape leaving the capstan and pressure roller is not immediately taken up by the tape roll in the cartridge. Under such conditions, if the tape tends to stick to the pressure roller, energization of the tape drive system may result in the tape wrapping around the pressure roller and jamming the cartridge or breaking the tape.

It is an object of the present invention to provide an improved magnetic tape cartridge.

Another object of the present invention is to provide an improved tape cartridge in which the tape is prevented from wrapping around the pressure roller, particularly during initial periods of operation when the tape is driven by the pressure roller and capstan but is not taken up by the tape roll in the cartridge.

In accordance with one embodiment of the present invention, an endless loop tape cartridge includes a pressure roller positioned within the cartridge so as to cooperate with an external capstan to move magnetic tape past a transducing means. A tape stripping member is pivotally mounted in the cartridge adjacent the pressure roller so that the stripping member extends between the pressure roller and the tape. The stripping member is free to align itself in contact with the pressure roller to prevent the tape from wrapping around the pressure roller.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figures 1, 2, 3, 4, 5:
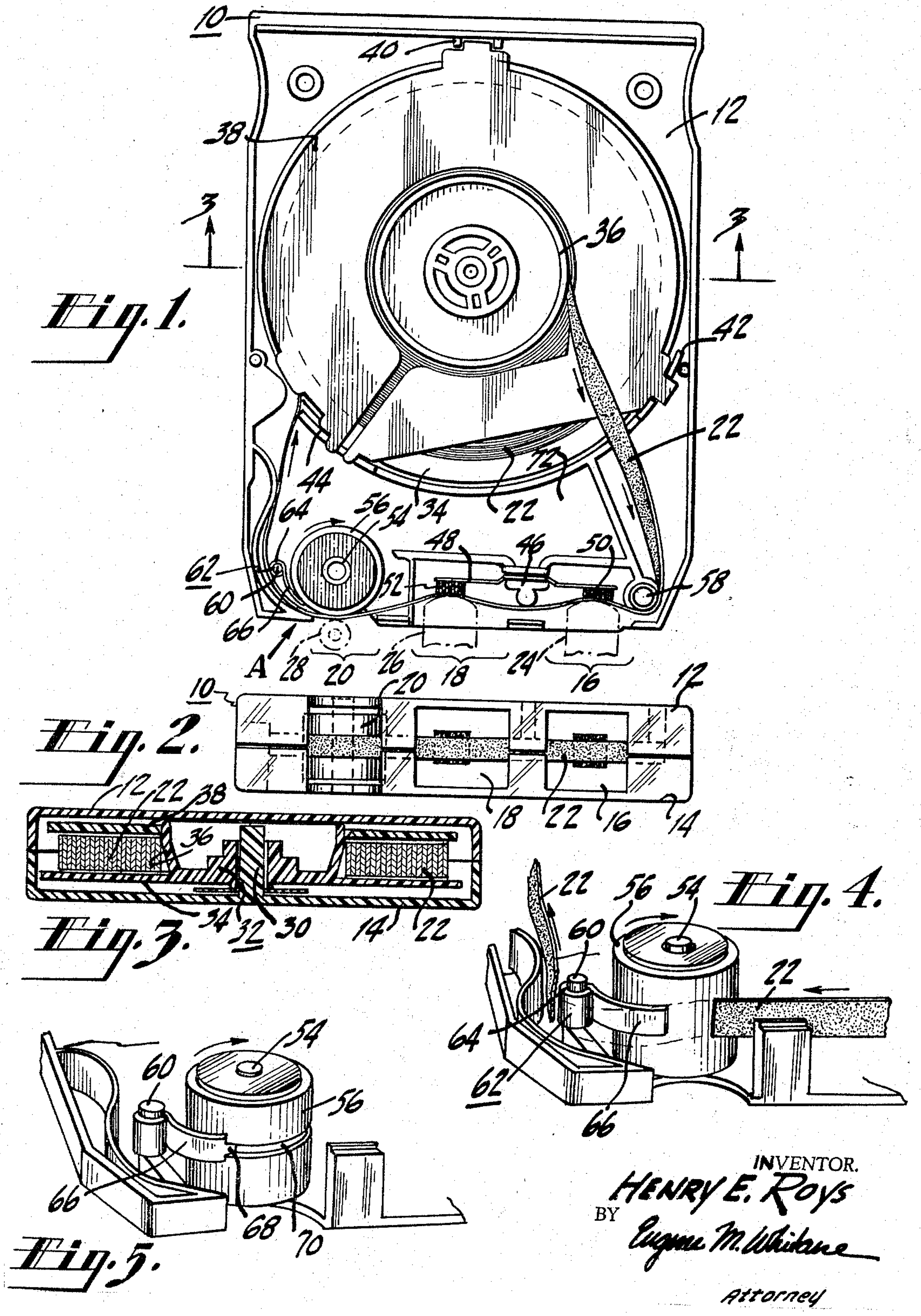
FIGURE 1 is a top plan view of an endless loop tape cartridge embodying the invention with the cover member removed.
FIGURE 2 is a front view of the cartridge of FIGURE 1 with the cover member in place.
FIGURE 3 is a front sectional view of the cartridge taken on section line 3—3 of FIGURE 1.
FIGURE 4 is an enlarged fragmentary perspective view of the cartridge taken in the direction of arrow A of FIGURE 1.
FIGURE 5 is a perspective view illustrating a modification of the structure of FIGURE 4.

Referring to the drawings wherein like reference numerals will be used to designate like parts in the various figures, and particularly to FIGURES 1 and 2, the tape cartridge includes a rectangularly shaped casing 10 having complimentary top 12 and bottom 14 portions. The front of the cartridge has three spaced, preferably rectangular apertures 16, 18, and 20 extending from right to left as viewed in FIG. 2. Apertures 16, 18, and 20 allow a magnetic tape 22 contained within the casing 10 to be exposed to operative contact with an erase or track sensing head 24, record-playback head 26, and drive capstan 28 respectively of an associated record-playback apparatus (not shown) when the cartridge is inserted into the apparatus as will be hereinafter described.

As shown in FIG. 3, an upright spindle 30 on the bottom portion 14 of the casing 10 serves as the bearing for tape spool 32. The tape spool 32 includes a circular bottom flange 34 and an integrally formed tapered hub 36 about which the magnetic tape 22 is spirally wound. The spool 32 is rotatably mounted on the spindle 30. An annular disc 38 is disposed about the top portion of the hub 36 and spaced from the top edge of the spiraled tape 22 by means of notched studs 40, 42 and 44 projecting upwardly from the bottom portion 14 of the casing 10. The spiral roll of tape 22 is constrained within the circumferential area bounded by the plate 34 by means of a downwardly extending annular flange (not shown) on the underside of the top portion 12 of the casing 10 and by the studs 40, 42 and 44. Cutouts are provided in the disc 38 to guide the tape from the inner convolution of the roll.

Upstanding from the bottom portion of the casing 10 and spaced in from the front wall is a pillar 46 supporting a spring member 48 having a pair of felt padded arms 50 and 52 in alignment with apertures 16 and 18 respectively. Spaced behind the aperture 20 is an upright post 54 on which a pressure roller 56 is rotatably mounted. When the cartridge is inserted into a record-playback apparatus, padded arms 50 and 52 effect a resilient engagement of the exposed tape with the apparatus erase head 24 and record-playback head 26 respectively, while the roller 56 presses the tape against the capstan 28 to frictionally draw the tape from right to left across the front portion of the cartridge and consequently across the erase head and record-playback head respectively.

The tape 22 passing across the front portion of the cartridge bears against a pair of upstanding guide posts 58 and 60 extending from the bottom portion 14 of the casing and at opposite sides thereof. In addition, a tape stripping member 62 comprising a hollow cylinder 64 having a free end portion 66 which is contiguous with the outer surface of the cylinder 64 and extends outwardly therefrom is pivotally mounted on the guide post 64. As shown in FIGURES 1 and 4, the free end portion 66 of stripping member 62 is in a position to bear against the pressure roller 56 and extends in a direction opposite to the direction of tape travel and pressure roller rotation toward a location adjacent the area of pressure roller contact with the tape. The stripping member is made of a low mass material such as beryllium copper, phosphor bronze, aluminum or the like.

Another example of a tape stripping member suitable for use in the cartridge of the present invention is shown in FIGURE 5. Here the free end portion 66 of the stripping member includes a finger like projection 68 which extends into an annular groove 70 formed in the surface of the pressure roller 56.

In operation, the tape 22 is lead from the inner most convolution of the tape roll, around the tape guide post 58, across the front portion of the cartridge, around the guide post 60 and stripping member 62 and then back to the outermost convolution of the tape roll. In order to improve wow and flutter characteristics of the cartridge during record or playback operation a certain amount of slack or looseness is provided in the tape roll.

When the cartridge is plugged into its associated playback apparatus and the system energized, due to the looseness of the tape roll, tape leaving the capstan 28 and pressure roller 56 may not be immediately taken up by the tape roll, but instead will serpentine back and forth within a walled storage chamber 72 behind the spring member 48. This action will continue until sufficient friction is built up between the hub 36 and the innermost convolution of the tape roll to cause the hub 36 to rotate as the tape is withdrawn from the roll, whereupon the slack tape will be taken up by the roll.

If the tape should adhere to the pressure roller then energization of the tape drive system may result in the tape wrapping around the pressure roller and jamming the cartridge or breaking the tape. By positioning the stripping member 62 in the manner illustrated, the movement of the tape will cause the free end 66 of the stripping member 62 to bear against the pressure roller 56. Any adhesion or sticking of the tape to the pressure roller 56 will be relieved by the peeling action of the stripping member 62 as its free end 66 contacts the roller surface. Tape which might have adhered to the roller is thus prevented from wrapping around the roller and breaking or causing a binding action.

What is claimed is:

1. In an endless loop tape cartridge of the type including a pressure roller operably arranged to effect transport of a magnetic tape in cooperation with mechanism including a capstan drive means, the combination of:

means in said cartridge to guide tape from an endless loop past said pressure roller; and tape stripping means pivotally mounted in said cartridge in a position to bear against said pressure roller and extend in a direction opposite to the direction of tape travel and pressure roller rotation toward a location adjacent the area of pressure contact of the tape.

2. In an endless loop tape cartridge of the type including a pressure roller operably arranged to effect transport of a magnetic tape in cooperation with an external capstan drive means, the combination of:

means in said cartridge to guide tape from an endless loope past said pressure roller; and tape stripping means pivotally mounted in said cartridge in a position to bear against said pressure roller at a location adjacent the area of pressure contact of tape by the pressure roller and external capstan drive means and on the tape exit side of said area of pressure contact of tape.

3. An endless loop tape cartridge according to claim 2 wherein said tape stripping means comprises a hollow cylinder having a free end portion extending outwardly therefrom to bear against said pressure roller.

4. In an endless loop tape cartridge of the type including a pressure roller operably arranged to effect transport of a magnetic tape in cooperation with an external capstan drive means, the combination of:

a guide post in said cartridge positioned adjacent the area of pressure contact of tape by the pressure roller and external capstan drive means; and tape stripping means pivotally mounted on said guide post and extending in a direction opposite to the direction of tape travel and pressure roller rotation.

5. In an endless loop tape cartridge operable with an external capstan for moving a magnetic tape past a transducing means:

a pressure roller in said cartridge positioned to effect transport of said tape by said capstan;

means in said cartridge to guide tape from an endless loop past said pressure roller; and a hollow cylinder pivotally mounted on said guide means and having a tab like projection extending outwardly therefrom in a direction opposite to the direction of tape travel and pressure roller rotation.

whereby said tab like projection is free to bear against said pressure roller when said tape is moved past said transducing means.

6. In an endless loop tape cartridge operable with an external capstan for moving a magnetic tape past a transducing means:

a pressure roller in said cartridge positioned to effect transport of said tape by said capstan;

a guide post in said cartridge positioned adjacent the area of pressure contact of tape by said pressure roller and external capstan; and a hollow cylinder pivotally mounted on said guide post and having a tab like projection extending outwardly therefrom in a direction opposite to the direction of tape travel and pressure roller rotation, whereby said tab like projection is free to bear against said pressure roller when said tape is moved past said transducing means.

7. And endless loop tape cartridge for use with apparatus containing a transducer and tape driving means comprising:

a casing;

a spindle within said casing and upstanding from the bottom portion thereof, a spool rotatably mounted on said spindle and containing an endless roll of magnetic tape spirally wound thereon, said roll including a loop portion projecting along the front of said casing to the outside of and from the center of said roll, the front of said casing having at least two apertures transversely spaced to expose tape from said loop portion for operative engagement by said transducer and tape driving means respectively;

a pressure roller positioned within said casing to effect transport of said tape by said driving means;

means in said casing to guide tape from said loop portion past said pressure roller; and tape stripping means pivotally mounted in said casing in a position to bear against said pressure roller at a location adjacent the area of pressure contact of tape by the pressure roller and tape driving means and on the tape exit side of said area of pressure contact of tape.

8. An endless loop tape cartridge for use with apparatus containing a transducer and tape driving means comprising:

a casing;

a spindle within said casing and upstanding from the bottom portion thereof;

a spool rotatably mounted on said spindle and containing an endless roll of magnetic tape spirally wound thereon, said roll including a loop portion projecting along the front of said casing to the outside of and from the center of said roll, the front of said casing having at least two apertures transversely spaced to expose tape from said loop portion for operative engagement by said transducer and tape driving means respectively;

a pressure roller positioned within said casing to effect transport of said tape by said driving means;

a guide post in said casing positioned adjacent the area of pressure contact of tape by the pressure roller and driving means and on the tape exit side of said area of pressure contact of tape; and a hollow cylinder pivotally mounted on said guide post and having a tab like projection extending outwardly therefrom in a direction opposite to the direction of tape travel and pressure roller rotation;

whereby said tab like projection bears against said pressure roller when said tape is in transport.

References Cited

UNITED STATES PATENTS

| | | | |
|---|---|---|---|
| 2,982,546 | 5/1961 | Endo | 271—71 |
| 3,065,310 | 11/1962 | Cross | 179—100.2 |
| 3,217,997 | 11/1965 | Lundgren et al. | 242—55.19 |
| 3,281,042 | 10/1966 | Hardison et al. | 226—118 |

FRANK J. COHEN, *Primary Examiner.*

L. D. CHRISTIAN, *Assistant Examiner.*